United States Patent [19]
Shin

[11] Patent Number: 5,645,908
[45] Date of Patent: Jul. 8, 1997

[54] MULTI-LAYER OPTICAL RECORDING DEVICE

[75] Inventor: Se-kyoon Shin, Suwon, Rep. of Korea

[73] Assignee: Samsung Electronics Co., Ltd., Kyungki-Do, Rep. of Korea

[21] Appl. No.: 539,741

[22] Filed: Oct. 5, 1995

[30] Foreign Application Priority Data

Nov. 11, 1994 [KR] Rep. of Korea ............... 1994-29603

[51] Int. Cl.⁶ .................................................. B32B 3/00
[52] U.S. Cl. .................. 428/64.1; 428/642; 428/644; 428/457; 428/913; 430/270.12; 430/495.1; 430/945; 369/275.1
[58] Field of Search ................. 428/64.1, 64.2, 428/64.4, 457, 913; 430/270.1, 270.11, 270.12, 495, 945; 369/275.1, 283, 288

[56] References Cited

U.S. PATENT DOCUMENTS 4,821,148  4/1989  Kobayashi et al. ................ 361/392

OTHER PUBLICATIONS

Brusic et al., "Corrosion of Thin Film Magnetic Disk: Galvanic Effects of the Carbon Overcoat", J. Electrochemical Soc., 136, 42 (1989).

Marcel Pourbaix, "Atlas of Electrochemical Equilibria in Aqueous Solutions", Pergamon Press, New York (1966) pp. 393–398.

Ebersbach et al, "On the Kinetics of the Anodic Passivation of Iron, Cobalt and Nickel" Electrochemical Acta, 12, 927 (1967).

Steppan et al., "A Review of Corrosion Failure Mechanisms during Accelerated Tests", J. Electrochemical Soc., 134, 175 (1987).

Brusic et al., "Copper Corrosion With and Without Inhibitors" J. Electrochemical Soc., 138, 2253 (1991).

Brusic et al., "Growth Kinetics, Polymerization and Protection of Cu–X–BTA Films", Int'l Sym. on Control of Copper Alloys Oxidation, Jul. 6–8, 1992, Edition de la Revue de Metallurgy, 1 rue Paul Cezanne, Paris, France, 2Q 1993.

Thomas et al., "Correlation of Surface Wettability and Corrosion Rate for Benzotriazole-Treated Copper", J. Electrochemical Soc., 139, 678 (1992).

Brusic et al., "Corrosion and Protection of a Conductive Silver Paste", J. Electrochemical Soc., 142, 2591 (Aug. 1995).

Primary Examiner—Newton Edwards
Assistant Examiner—Elizabeth Evans
Attorney, Agent, or Firm—Sughrue, Mion, Zinn, Macpeak & Seas

[57] ABSTRACT

A multi-layer optical recording medium having a first reflecting film next to an optical incident surface, and a plurality of reflecting films having different optical reflecting characteristics from each other. The first film is formed of two layers which have a large difference of refractive indices. With such a dielectric being used as a first reflecting film, the reflectivity of the first reflecting film is increased, the structure is simple and a multi-layer optical disk with increased storage capacity can be obtained.

5 Claims, 2 Drawing Sheets

MULTI-LAYER OPTICAL RECORDING DEVICE

BACKGROUND OF THE INVENTION

1. Field of the Invention

The present invention relates to a multi-layer optical recording medium such as a video disk or a compact disk, and more particularly to, a multi-layer optical recording medium in which a reflectivity of a first reflecting layer is improved.

2. Description of the Related Art

FIG. 1 is a schematic illustration of the structure of a conventional optical disk. The conventional optical disk is made of a transparent resin material such as polymethylmethacrylate (PMMA) or polycarbonate (PC) and has a stacked structure of a transparent substrate 10 having a predetermined pit pattern, a reflecting film 12 formed by depositing a metal using an evaporation method, such as sputtering, on transparent substrate 10, and a protecting film 14 formed on reflecting film 12. The pit patterns of reflecting film 12 and transparent substrate 10 have the same shape. Information, i.e., the pit pattern formed in reflecting film 12, is read by an optical device in a known manner.

However, the conventional optical disk structure described above has a drawback in that the capacity of the optical disk is insufficient to store information requiring a larger density, such as video and audio information. The pit pattern on the disk is formed in a known manner to correspond to recorded information. For example, the pit pattern can be formed by press molding or by known ultraviolet techniques.

Accordingly, multi-layer optical disk structures are used to create a larger storage capacity. A multi-layer optical disk structure (U.S. Pat. No. 4,450,553 by Phillips) having reflecting layers of which reflecting coefficients are different from each other and a multi-layer optical disk structure (U.S. Pat. No. 5,126,996 by Pioneer) with silicon as the first reflecting layer and aluminum as the second reflecting layer have been proposed. These multi-layer optical disk structures will be explained with reference to FIGS. 2 and 3.

FIG. 2 shows the structure of the Phillips optical disk. An optical disk includes a transparent substrate 20 made of a thick PVC plate of about 1 mm, a first resin layer 22 formed on transparent substrate 20 and processed by ultraviolet rays, a first reflecting film 24 formed on first resin layer 22, a first adhesion layer 26 formed on first reflecting film 24, a spacing sheet 28 formed on first adhesion layer 26 and made of a thick PVC plate of about 0.15 mm, a second adhesion layer 30 formed on the spacing sheet 28, a second reflecting film 32 formed on second adhesion layer 31, a second resin layer 34 formed on second reflecting film 32 and processed by ultraviolet rays, and a transparent PVC plate 36 formed on second resin layer 34. First reflecting film 24 is adhered to spacing sheet 28 by first adhesion layer 26, and second reflecting film 32 is adhered to spacing sheet 28 by second adhesion layer 30.

The optical disk constructed as above has at least a two-layered reflecting optical structure. In each reflecting optical structure, the reflecting layers are constructed to have different reflecting coefficients with respect to each other. A stronger reflected light from the reflecting layers makes for easier reading of the information recorded on the reflecting film. Also, the ratio of incident light to reflected light depends on the number of layers in the optical structure. In the case of a two-layered reflecting optical structure as shown in FIG. 2, first reflecting film 24 is made of, for example, a dielectric material to transmit part of the radiated light beam ($\lambda$) from the light source. In such a structure, the reflecting rate of a proper order is needed to read out precisely the information stored in first and second reflecting films 24 and 32. It is preferable that the reflecting rate of the first reflecting film 24 is 25-40%, and the reflecting rate of the second reflecting film 32 is 45-100%. Reflected light from the different layers is distinguished based on the intensity thereof to read properly the recorded information.

Since the above optical disk structure is formed to have more than two optical reflecting layers more than twice the conventional information storage capacity is attained in the same area. However, since the optical disk structure has a multi-layered structure composed of the resin layers, the adhesion layers, and the spacing layer, the manufacturing processes are difficult.

FIG. 3 shows the structure of the Pioneer optical disk. This multi-layer optical disk has a structure composed of a transparent substrate 50 made of a transparent resin such as PMMA or PC material as in the conventional case, a first reflecting film 52 formed on the transparent substrate, an adhesion layer 54 to adhere the first reflecting film 52 to a second reflecting film 56, a second reflecting film 56 adhered to the first reflecting film 52 by the adhesion layer, and a protecting film 58 formed on the second reflecting film 56. The first reflecting film 52 is made of silicon and the second reflecting film 56 is made of aluminum. These materials selectively reflect light depending on wavelength.

According to this structure, the first wavelength ($\lambda_1$) of a beam radiated from a light source is reflected by the first reflecting film and the second wavelength ($\lambda_2$) is transmitted. The second reflecting film reflects at least part of the second wavelength ($\lambda_2$). When the information of the first reflecting film is read, the first wavelength ($\lambda_1$) reflected by the first reflecting film is used. When the information of the second reflecting film is read, the second wavelength ($\lambda_2$) transmitting the first reflecting film and reflected by the second reflecting film is used. Namely, in the above structure, light rays of a certain wavelength are transmitted through the first reflecting film (silicon layer) and reflected by the second reflecting film (aluminum layer). Accordingly, the information of each layer can be read by distinguishing the different wavelengths received by a detector.

The structure of the above optical disk is relatively simple. However, since the information of one layer is distinguished from information from another layer by wavelength and laser diodes used as a general light source generate a single wavelength, there must be a laser diode in the reading device for each of the layers. Thus, the reproducing device becomes complicated and expensive.

SUMMARY OF THE INVENTION

It is an object of the present invention to solve the above-noted problems and provide a multi-layer optical recording device having an increased storage capacity and of which the reflectivity of the first reflecting layer is improved.

To accomplish these objects, there is provided a multi-layer optical recording device which has a plurality of reflecting films having different optical reflecting characteristics from each other and including information capable of being read optically. A first reflecting film next to an optical incident surface is composed of two layers each layer of which has a different refractive index.

It is preferable that both of the layers are formed of dielectric materials, and the refractive index of a first dielectric layer, being next to the substrate, is greater than that of a second dielectric layer. The refractive index of the first dielectric layer is preferably greater than 2.2 and that of the second dielectric layer is preferably less than 1.3.

Since the first reflecting film employs the first and second dielectric layers of which the refractive indices are much different from each other, the reflectivity of the first reflecting film is improved and the information storage capacity of the optical disk is increased.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
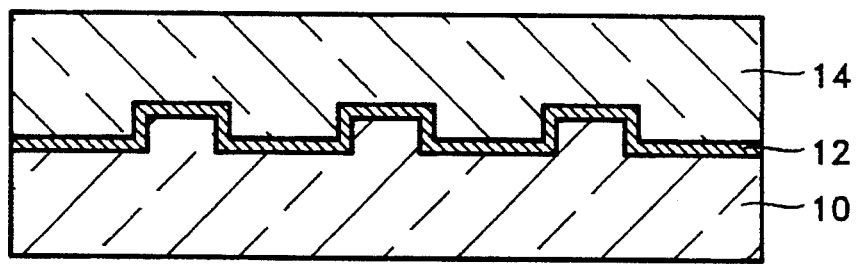
FIGS. 1–3 are cross sections of conventional optical recording media.
Figure 2:
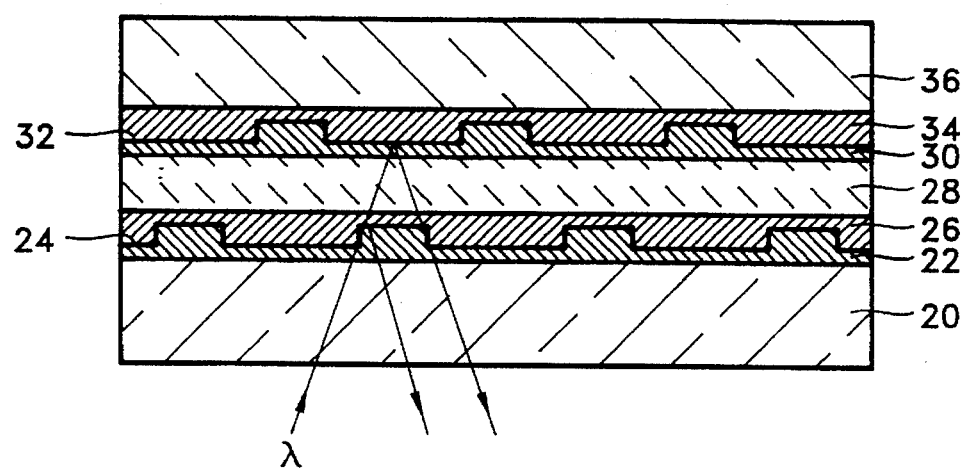
Figure 3:
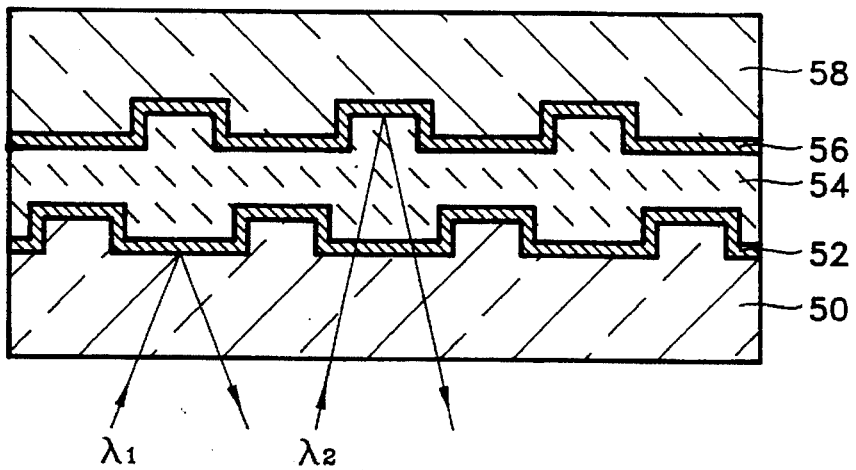
Figure 4:
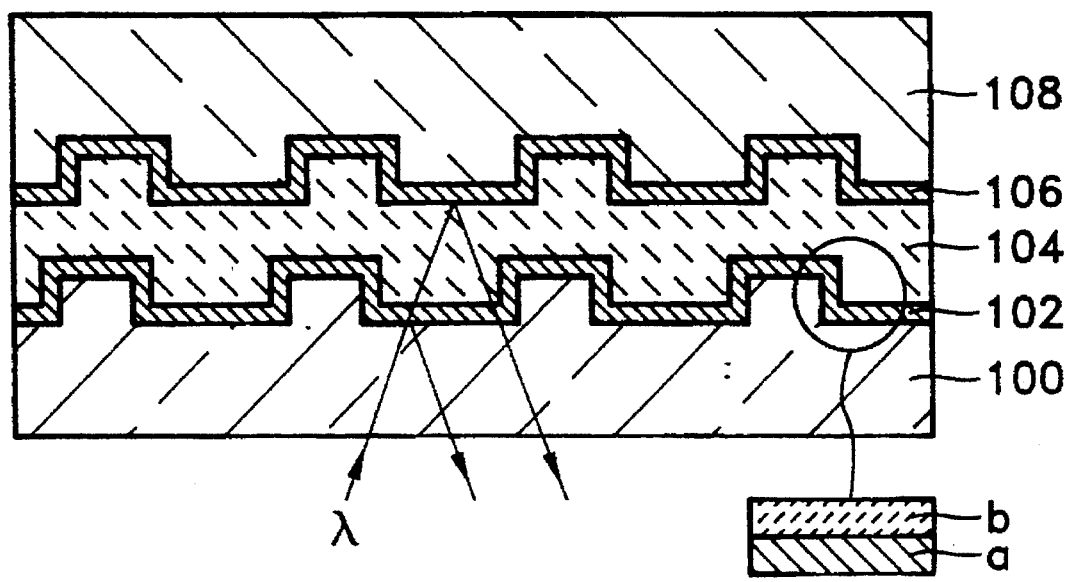
FIG. 4 is a cross section showing an embodiment of the multi-layer optical recording medium according to the present invention.

FIG. 4 is a schematic showing one embodiment of a multi-layer optical recording medium according to a preferred embodiment of the present invention.

An optical disk according to the preferred embodiment is composed of a transparent substrate 100 made of a transparent resin such as PMMA or PC material, a first reflecting film 102 formed on the transparent substrate, an adhesion layer 104 adhering first reflecting film 102 to a second reflecting film 106, and a protecting film 108 formed on second reflecting film 106. First reflecting film 102 next to transparent substrate 100 consists of two layers in contact with one another. Both of these layers are preferably formed of dielectric materials. A first dielectric layer a is disposed next to transparent substrate 100 and a second dielectric layer b, whose refractive index is different from that of layer a, is disposed on layer a. The refractive index of first dielectric layer a is greater than that of second dielectric layer b. It is preferable that the difference between the above refractive indices is more than 0.8.

Since the structure of the preferred embodiment is simple, it is easy to manufacture. Also, because the first reflecting film is formed to have a two-layered dielectric construction, it is possible to reproduce the recorded information by using a single light source. Further, when the dielectric material for forming the first and second dielectric layers is properly selected, it is possible to improve the refractive index of the first reflecting film and thus reflectivity of the recording medium. The above process is explained below referring to FIG. 5.

Figure 5:
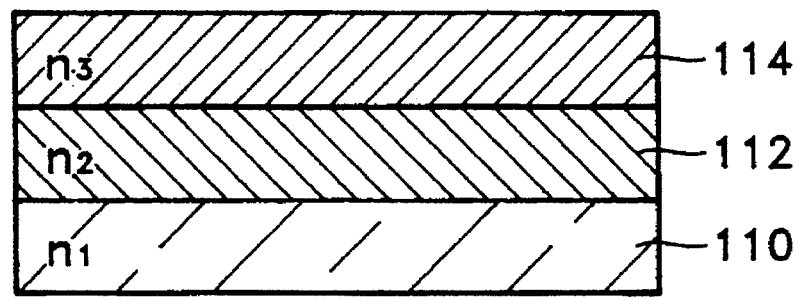
FIG. 5 is a view for explaining the relationship between refractive index and reflectivity.

FIG. 5 illustrates the relationship between refractive index and reflectivity of an element. In the stacked structure of a first layer 110, a second layer 112 and a third layer 114, the reflectivity (R) of second layer 112, i.e., the middle layer, is determined by the refractive indices of the first, second, and third layers, thus:

$$R = \frac{r_{12}^2 + r_{23}^2 + 2r_{12}r_{23}\cos\beta}{1 + r_{12}^2 r_{23}^2 + 2r_{12}r_{23}\cos\beta} \quad \text{Equation (a)}$$

-continued $$r_{12} = \frac{n_1 - n_2}{n_1 + n_2}$$

$$r_{23} = \frac{n_2 - n_3}{n_2 + n_3} \quad \text{Equation (b)}$$

If $\cos\beta = -1$ for maximum reflectivity then:

$$R = \frac{(n_1 n_3 - n_2^2)^2}{(n_1 n_3 + n_2^2)^2} \quad \text{Equation (c)}$$

where $n_1$ denotes the refractive index of the first layer, $n_2$ denotes the refractive index of the second layer, and $n_3$ denotes the refractive index of the third layer. Equations (a) and (b) are well known and are disclosed generally in *Foundations of Electromagnetic Theory*, third edition, by John R. Reitz, page 405.

According to Equation 1, the reflectivity (R) increases for smaller refractive indices $n_1$ and $n_3$ of first layer 110 and third layer 130 or for a larger refractive index $n_3$ of second layer 112. Accordingly, since the second layer is made of a dielectric material having a high refractive index and first layer 110 and third layer 114 are made of a dielectric material having low refractive indices, it is possible to increase the reflectivity of second layer 112.

If the above relationship is applied to the recording medium, since first, second and third layers 110, 112 and 114 correspond to transparent substrate 100, first dielectric layer a and second dielectric layer b, respectively, by masking the first dielectric layer a with a dielectric material having a high refractive index and the second dielectric layer b with a dielectric material having a low refractive index, the reflectivity of first reflecting layer 102, i.e., first dielectric layer a, can be increased.

In the conventional device wherein the first reflecting film is formed of one layer, the transparent substrate and the adhesion layer are made of polyvinylchloride (PVC) or PC. The refractive index of resins such as PVC or PC cured by ultraviolet rays is about 1.4. Since the refractive indices of the transparent substrate and the adhesion layer are fixed as above, the reflectivity of the first reflecting layer depends on the refractive index of the first reflecting film.

In the present invention, as fully explained above, since the first dielectric layer of the first film is made of a dielectric material having a high refractive index and the second dielectric layer of the first film is made of dielectric material having a low refractive index, the reflectivity of the first reflecting film can be increased.

According to the preferred embodiment of the present invention, the first dielectric layer is made of a material whose refractive index is greater than or equal to 2.2 and the second dielectric layer is made of a material whose refractive index is less than or equal to 1.3.

According to the invention, since a two-layered dielectric material, the constituents of which have a large difference in their refractive indices, is used as the first reflecting film, it is possible to obtain an optical disk which has an improved reflectivity of the first reflecting film, is easy to manufacture, and has increased information storage capacity.

The present invention is not limited to the above embodiment and many modifications can be made by those of ordinary skill of the art without departing from the scope of the claimed invention. For example, the present invention is not limited to the two-layered structure and can be applied to a structure consisting of more than two layers.

What is claimed is:

1. A multi-layer optical recording medium comprising:

a plurality of reflecting films having different optical reflecting characteristics from each other and including information capable of being read optically, wherein at least a first of said reflecting films which is next to an optical incident surface is composed of two layers, said two layers having different refractive indices with respect to one another.

2. A multi-layer optical recording medium according to claim 1, wherein said two layers of said first reflecting film are each made of a dielectric material.

3. A multi-layer optical recording medium according to claim 1, wherein, a first of said two layers, which is next to a substrate, is made of a material having a refractive index that is greater than that of a second of said two layers.

4. A multi-layer optical recording medium according to claim 3, wherein a refractive index of the first layer is greater than or equal to 2.2.

5. A multi-layer optical recording medium according to claim 3, wherein a refractive index of the second layer is less than or equal to 1.3.

* * * * *